United States Patent
Stein et al.

[11] Patent Number: 5,483,845
[45] Date of Patent: Jan. 16, 1996

[54] APPARATUS AND METHOD FOR SIDE IMPACT TESTING

[75] Inventors: Douglas J. Stein, Oxford; Frederick M. Peters, Northville; James R. Kelly, Richmond; Chad J. Ivan, Fenton, all of Mich.

[73] Assignee: Morton International, Inc., Chicago, Ill.

[21] Appl. No.: 304,386

[22] Filed: Sep. 12, 1994

[51] Int. Cl.⁶ .......................... G01M 7/08; G01M 19/00; G01M 17/00; G01N 3/30
[52] U.S. Cl. ................ 73/865.3; 73/12.01; 73/12.04
[58] Field of Search .................... 73/865.3, 866.4, 73/12.01, 12.04, 12.07

[56] References Cited

U.S. PATENT DOCUMENTS

| | | | |
|---|---|---|---|
| 2,412,860 | 12/1946 | Baudry et al. | 73/12.04 |
| 2,689,938 | 9/1954 | Larson | 73/12.04 X |
| 2,810,288 | 10/1957 | Herron et al. | 73/12.07 |
| 3,001,393 | 9/1961 | Greayer | 73/12.07 |
| 3,073,148 | 1/1963 | Muller | 73/12.04 |
| 3,200,634 | 8/1965 | Rickards | 73/12.04 |
| 3,430,481 | 3/1969 | Shinbaum et al. | 73/12.04 |
| 3,757,562 | 9/1973 | Goldberg et al. | 73/12.04 |
| 4,524,603 | 6/1985 | Hargunani et al. | |
| 4,599,897 | 7/1986 | Hunter | 73/147 X |
| 5,338,206 | 8/1994 | Hupter | 73/865.3 X |
| 5,373,749 | 12/1994 | Strand et al. | 73/865.3 |

*Primary Examiner*—Thomas P. Noland
*Attorney, Agent, or Firm*—George W. Rauchfuss, Jr.; Gerald K. White

[57] ABSTRACT

Apparatus for simulating a side impact vehicle crash comprises a test dolly assembly slidably mounted for longitudinal movement on a slidably mounted sled carriage accelerated by a pressure differential firing means. The test dolly assembly is essentially stationary on a track fixedly mounted on the sled carriage assembly until a ram on the sled carriage assembly strikes an impact block on the test dolly assembly.

15 Claims, 3 Drawing Sheets

APPARATUS AND METHOD FOR SIDE IMPACT TESTING

FIELD OF THE INVENTION

This invention relates to apparatus and a method for impact testing, particularly for impact testing in simulated automobile crashes and more particularly to apparatus and method for dynamic testing of passenger restraint devices, such as seat belts and airbags, in a simulated side impact crash of an automobile with a seated occupant.

BACKGROUND OF THE INVENTION

In recent years vehicle occupant safety has been a major concern of the automotive industry. While full size automobiles are sometimes used by the government and industry for final impact tests, it is generally impractical to use full size automobile for impact testing particularly during design and research stages necessary to ensure compliance with government mandated safety standards.

In order to comply with these safety standards, various impacts must be tested at various speeds. Thus, a multiplicity of vehicles must be subjected to a wide variety of crash conditions to obtain the necessary safety data and information.

For front end crash simulation, there has been available f,or some time a crash simulator apparatus known in the industry as a HYGE crash simulator. Said apparatus comprises a pressure differential firing means, utilizing both hydraulic and pneumatic pressures, which terminates in a thrust column. Upon actuation of the firing means, the thrust column accelerates a sled carriage suitably mounted on a track to be movable along said track. A test buck housing a forward facing vehicle occupant or driver specimen, generally in the form of an anthropomorphic dummy, is fixed mounted on the sled carriage. Acceleration of the sled carriage by the thrust column produces rapid acceleration of the movable sled carriage and thereby also of the test buck. As a result of the rapid acceleration of the sled carriage and test buck along the track, the occupant or driver test specimen is subjected to a rapid change in longitudinal velocity relative to the test buck thereby simulating a front end impact crash of an automobile vehicle. By using said HYGE crash simulator it is possible to reproduce essentially the crash conditions and parameters, such as a velocity-time profile, encountered by an occupant of a vehicle during a front end impact crash. Generally, in frontal crashes one has about an 80 millisecond period after the impact to establish the deceleration pattern typical of such frontal crashes. Deployment of test occupant airbags is to occur about 10 to 20 milliseconds after the impact.

More recently, side impact safety of vehicle occupants has become of increased concern and thus the necessity to test and evaluate side impact airbags. While at first blush it might seem apparent to simply rotate the test buck of a typical HYGE crash simulator by about 90°, so that it is placed sideways on the HYGE apparatus in order to produce lateral acceleration of an occupant to simulate the conditions and parameters of a side impact crash of an automobile, this has proved unsuccessful. One reason is that doing so does not enable one to produce essentially the crash conditions encountered during a side impact crash at 33 mph, the crash speed required under the presently mandated safety standards. For a side impact crash at 33 mph, the critical acceleration/deceleration pattern encountered is produced within about 30 milliseconds and deployment of a side impact airbag to be tested must occur about 5 milliseconds after impact. Simply turning the occupant-inhabited test buck sideways on such a HYGE crash simulator does not permit one to obtain the necessary acceleration of the test buck to about 20 mph within about a 20 milliseconds. Limitations in the sled carriage propulsion system prevent the test buck from reaching the velocity vs time profile needed to correctly simulate side impact crash tests.

It is therefore desirable to provide apparatus and methodology for developing the velocity vs time profile to produce the necessary dynamic parameters needed to more correctly simulate conditions of a side impact crash. A further object of this invention is to provide apparatus and methodology to more correctly simulate side impact crash conditions and to do so while using current accelerator type sled apparatus with modifications thereof. A still further object of this invention is to provide such apparatus and methodology while keeping all test components within the confines of the sled carriage of a HYGE type accelerator system and thereby minimizing, as much as possible, any requirement for use of additional equipment, controls, cameras and camera power and control and the like. Yet another object of this invention is to provide such apparatus and methodology such that no additional braking system would be required to perform post-test deceleration of the test structure.

SUMMARY OF THE INVENTION

The invention involves an apparatus and methodology for more accurately simulating the dynamic parameters present in a side impact crash for testing crash members of an automotive restraint system, particularly automobile doors and side impact airbags. The apparatus and methodology utilizes a dolly assembly slidably mounted to a track system attached to the top surface of a sled carriage of the type used in current accelerator type sled carriage apparatus. The dolly assembly can be slidably mounted through slide bearings to rails attached, such as with bolts, to the top surface of an existing sled carriage. When the sled carriage is accelerated by a propulsion means, such as a pressure differential firing mechanism, the inertia of the dolly keeps it stationary until it is struck and accelerated by a part of the moving sled carriage. The rate of acceleration of the dolly may be controlled by interposing an energy absorbing material between impacting surfaces of the sled carriage and the dolly assembly.

The apparatus for dynamic testing by rapidly accelerating a test specimen will generally comprise, in combination, a pressure differential firing means terminating in a thrust column or surface; a sled carriage slidably mounted on first track means attached to a fixed foundation for free longitudinal movement of said sled carriage along the track means, said sled carriage having a horizontal top surface terminating in a leading edge at one end and a trailing edge at an opposite end of the sled carriage, the trailing edge positioned for being accelerated by the thrust column upon actuation of the firing means; second track or guide means fixedly mounted on the top horizontal surface of the sled carriage, longitudinally between the leading edge and the trailing edge thereof; ram means located on said horizontal surface of the sled carriage adjacent the trailing edge; a test dolly assembly slidably mounted on said second track or guide means for free longitudinal movement along the second track means, said test dolly assembly comprising a frame structure member having: a leading face and a trailing face, an impact block facing toward the trailing face of said frame structure and being strikable by said ram means for imparting longitudinal movement to said test dolly assembly along the second track or guide means, a crash test member, generally an automobile door, facing toward the leading face of the frame structure, and adjacent the crash test member, on a side thereof opposite the impact block, a seating means for seating an anthropomorphic test specimen; said test dolly assembly being essentially stationary on the second track means of the sled carriage due to inertia thereof until the ram means on the sled carriage moving longitudinally on the first track means strikes the impact block of the test dolly assembly. Preferably, an energy absorbing material, such as an aluminum honeycomb material, is mounted to an impact surface on either the ram or the impact block. The seating means may be fixedly mounted to the test dolly assembly or may be slidably mounted on a third set of track or guide rails and bearing located on the test dolly assembly.

The method for conducting such dynamic testing by rapidly accelerating a test specimen will generally comprise: (1) providing a pressure differential firing means terminating in a thrust column; a sled carriage slidably mounted on first track means attached to a fixed foundation for free longitudinal movement of said sled carriage along the track means, said sled carriage having a horizontal top surface terminating in a leading edge at one end and a trailing edge at an opposite end of the sled carriage, the trailing edge positioned for being accelerated by the thrust piston upon actuation of the firing means, a second track means fixedly mounted on the top horizontal surface of the sled carriage, longitudinally between the leading edge and the trailing edge thereof, a ram means located on said horizontal surface of the sled carriage adjacent the trailing edge; a test dolly assembly slidably mounted on said second track means for free longitudinal movement along the second track means, said test dolly assembly comprising a frame structure member having a leading face and a trailing face, an impact block facing toward the trailing face of said frame structure and being strikable by said ram means for imparting longitudinal movement to said test dolly assembly along the second track means, a crash test member, generally an automobile door, facing toward the leading face of the frame structure, and adjacent the crash test member, on a side thereof opposite the impact block, a seating means for seating an anthropomorphic test specimen, an anthropomorphic test specimen seated on said seating means and facing perpendicular said second track means; said test dolly assembly being stationary on the second track means of the sled carriage due to inertia thereof until the ram means on the sled carriage moving longitudinally on the first track means strikes the impact block of the test dolly assembly; (2) actuating the firing means to fire the thrust column whereby the thrust column accelerates the sled carriage for longitudinal movement along the first track means whereby the ram means strikes the impact block thereby overcoming the inertia of the test dolly on the second track means causing rapid acceleration of said test dolly assembly for longitudinal movement along the second track means whereby the crash test member and a side of the anthropomorphic test specimen are caused to impact each other in a simulated side impact vehicle crash; and (3) observing and/or recording the effect of the impact of the anthropomorphic test member with the crash test member.

DETAILED DESCRIPTION OF THE INVENTION

Figure 2:
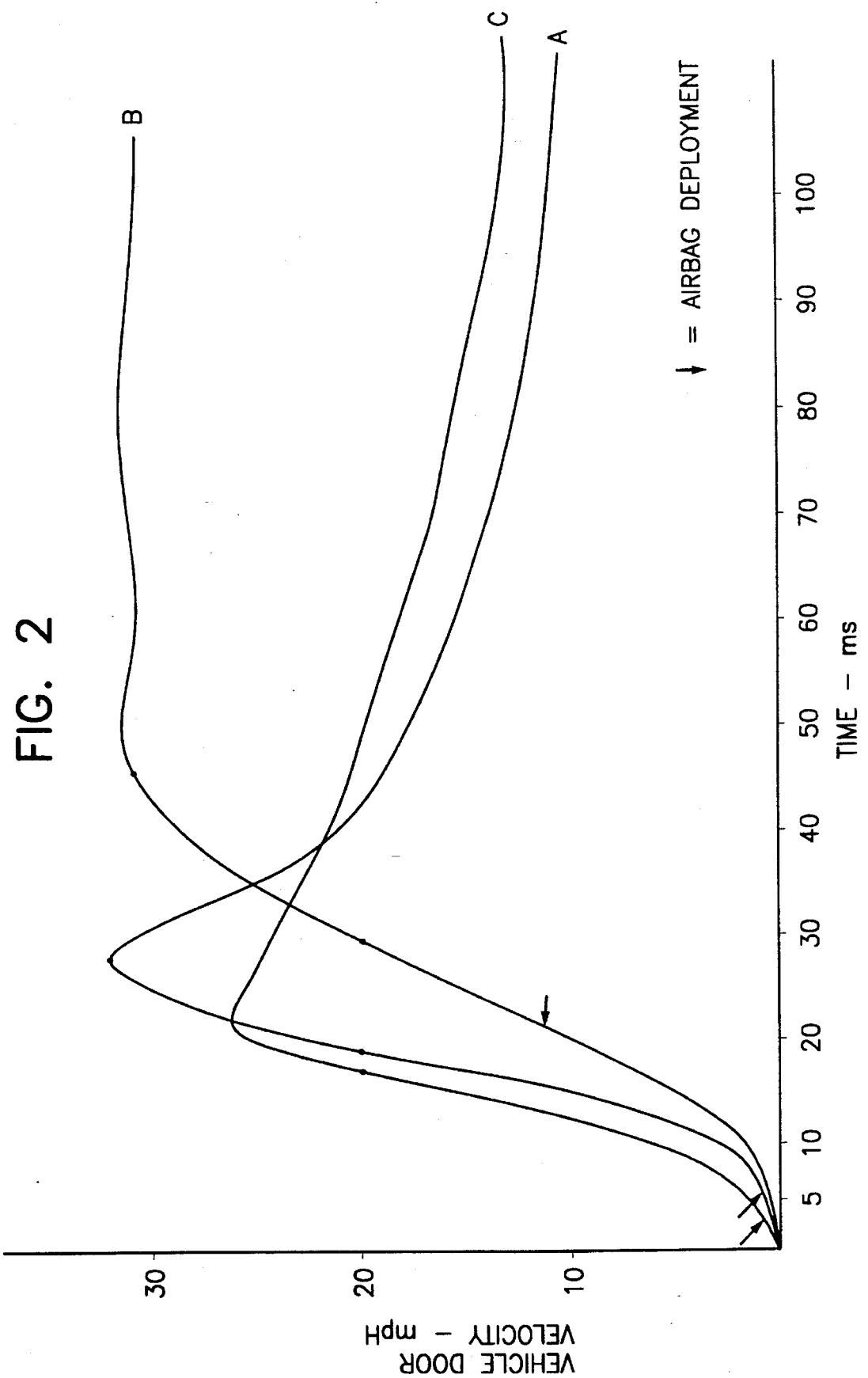
FIG. 2 is a graphic plot of velocity vs time for actual and simulated side impact crashes.

Referring first to FIG. 2, velocity vs time profile and data is presented in Curve A for an actual side impact crash for one automobile model. Observing Curve A, it is to be noted that vehicle door speed of 20 mph at the point of contact with an occupant or test specimen is achieved 19 ms (milliseconds) after $T_0$. Maximum door speed of about 26–27 mph peaks at about 23–24 ms after $T_0$. This Curve A thus represents the velocity vs time profile and parameters desired to be achieved in a simulated test apparatus.

Figure 1:
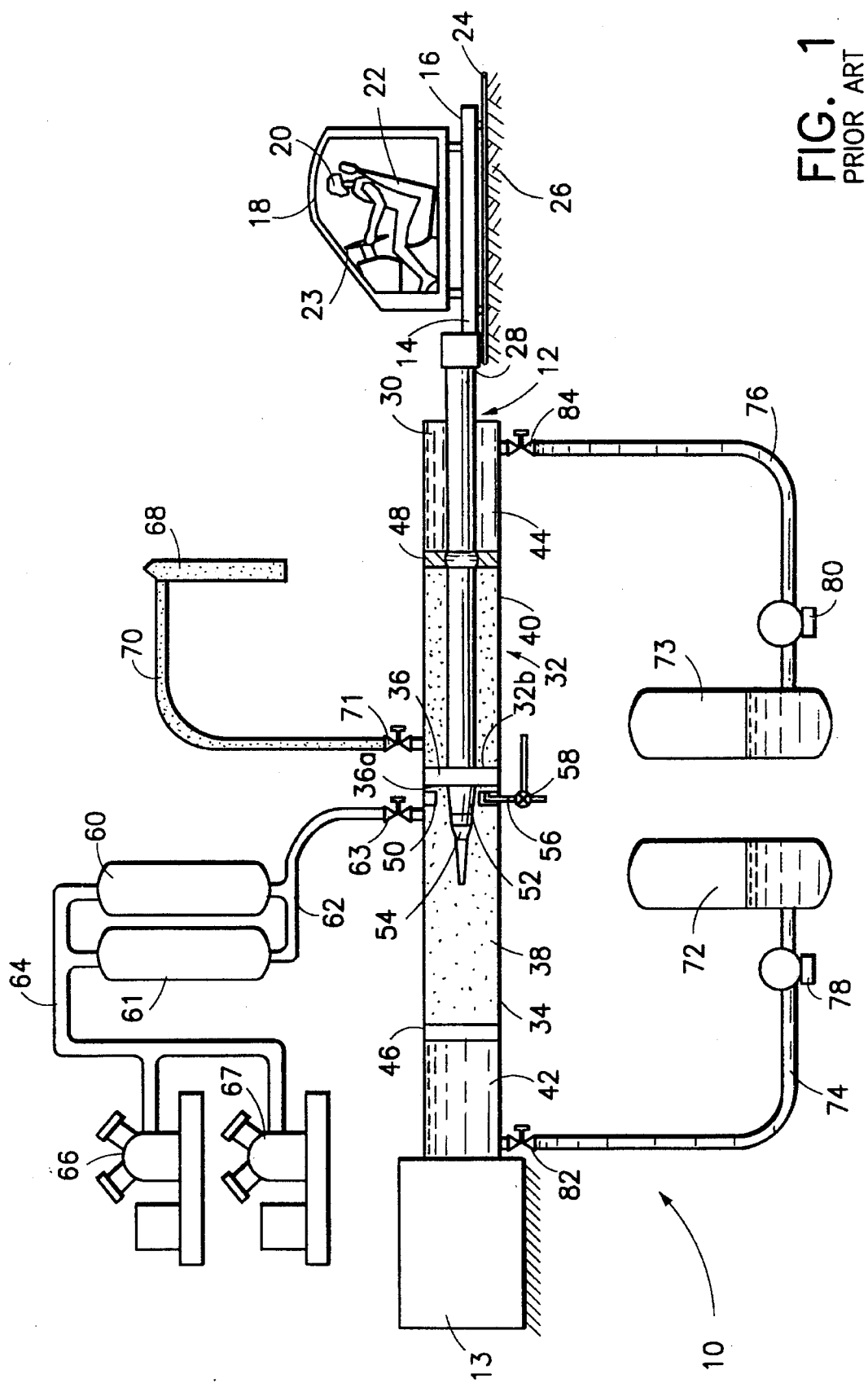
FIG. 1 is a diagrammatic drawing of a HYGE crash simulator apparatus known for use in frontal impact automotive crash testing.

FIG. 1 discloses a test apparatus and system generally employed successfully to simulated frontal impact crash conditions. Such an apparatus system is available as a HYGE crash simulator. Such a test apparatus system, designated generally by reference numeral 10, comprises a thrust apparatus, indicated generally by reference numeral 12, mounted in a reaction block footing 13 for accelerating a sled carriage 14. Fixedly mounted on the horizontal upper or top surface 16 of the sled carriage 14 is a test buck 18 representative of the driver/front seat passenger area of a vehicle such as an automobile or truck. Housed in test buck 18 is a frontal impact dummy 20 suitably seated in a vehicle seat 22. Shown in FIG. 1 is a driver dummy 20 seated in the usual manner adjacent to a steering wheel and column 23 housing an airbag module (not shown) for testing.

Sled carriage 14 is mounted on tracks 24 in a manner to be longitudinally movable along the tracks. Tracks 24 are suitably anchored on a foundation or base 26, such as a building floor, by means of bolts or other anchor means (not shown).

When an impact area 28 of sled carriage 14 is pushed by an accelerator element 30 of thrust means 12, sled carriage 14 and test buck 18 are rapidly accelerated longitudinally along tracks 24 resulting in test buck 18 being rapidly thrust or accelerated rearward toward the test dummy 20 in a manner capable of essentially simulating the crash parameters of a frontal impact crash.

Accelerating element 30 comprises a thrust column housed in a pressure differential firing mechanism, indicated generally by reference numeral 32, adapted to fire and rapidly accelerate the thrust column to a velocity required to replicate frontal impact crash parameters. Thrust column 30 extends into firing housing 34 of firing mechanism 32 and has a radial thrust piston 36 located at its internal end. Thrust piston 36 is located in chamber 34 between a high pressure compressed gas (e.g. air) chamber 38 and adjacent low pressure compressed gas (e.g. nitrogen) chamber 40. At their opposite ends, chambers 38 and 40 are adjacent hydraulic chambers 42 and 44, respectively, of variable volume. Chamber 38 and 42, as well as chambers 40 and 44, are separated by floating pistons 46 and 48, respectively. Chambers 38 and 40 are separated from each other by apertured wall 50. Wall 50 serves to separate chambers 38 and 40 prior to firing by having thrust piston 36 seal thereagainst. The aperture or orifice 52 in wall 50 serves as a metering orifice by accepting a metering pin 54 located on the internal end of thrust column 30 adjacent thrust piston 36. Firing mechanism 32 is provided with a trigger pressure inlet 56 of highly pressurized air for initial movement of thrust piston 36, moving the metering pin 54 to begin metered gas flow from chamber 38 to piston 36, accelerating thrust column 30 in the manner described hereinafter. Valve 58 in inlet 56 is utilized for actuation of the firing sequence.

Prior to firing, thrust piston 36 is in sealing engagement with wall 50 due to balanced pressure on opposite sides 36a and 36b of the thrust piston achieved through the different areas of the sides of the thrust piston exposed to the high and low pressures of chambers 38 and 40. By opening valve 58 of trigger pressure inlet 56 the balanced pressure on thrust piston 36 is disturbed and the increased pressure on side 36a of thrust piston 36 facing chamber 38 due to high pressurized air entering from inlet 56 causes thrust piston 36 to move longitudinally away from wall 50 and the resulting action of high pressure gas from chamber 38 upon the increased exposed area of the side 36a of the thrust piston 36 causes rapid longitudinal acceleration of thrust column 30 for accelerating sled carriage 14 on track 24.

The metering pin 54 of the apparatus system 10 can be of any suitable shape. The shape is chosen to provide a simulated velocity vs time profile pattern as close as possible to the pattern resulting from an actual vehicle crash desired to be simulated. It will be appreciated that the shape and length of such a metering pin 54 will vary with the structural features of various vehicles and thus one must choose a metering pin suitable for the actual vehicle being simulated.

High pressure gas chamber 38 is filled with pressurized air from air receivers 60 and 61 via lines 62 and valve 63 with the pressurized gas in the receivers 60 and 61 being provided by line 64 leading to the receivers 60 and 61 from air compressors 66 and 67. Similarly, low pressure chamber 38 is filled with nitrogen gas from nitrogen supply tank 68 via line 70 and valve 71. Suitable fluid reservoir tanks 72 and 73 store and provide hydraulic fluid to hydraulic chamber 42 and 44 via lines 74 and 76, pumps 78 and 80, and valves 82 and 84, respectively.

As stated previously in the BACKGROUND section, it would appear appropriate to simply provide a test buck, with a side impact dummy and a vehicle door, turned 90° from that shown in FIG. 1 in order to provide a suitable apparatus for simulating a side impact collision. However, doing so does not produce the necessary velocity-time profile. That is, when a highly aggressive metering pin 54 is chosen in an attempt to produce Curve A in FIG. 2, and a test apparatus 10 with a test buck rotated 90° from that shown in FIG. 1 is employed, firing of the thrust apparatus 12 produces a velocity-time profile as shown by Curve B in FIG. 2. As seen from said Curve B, the velocity-time profile produced in a simulated side impact crash with such an apparatus is quite different from the actual side impact crash profile of Curve A and the vehicle door speed of 20 mph is not able to be reached until 31 ms after $T_0$. Moreover, in such simulated test the gap between the test dummy and the door must be increased from 4 inches (actual side impact crash test) to about 10 inches to ensure the correct relative velocity between the dummy and door to be obtained prior to contact of the dummy by the door. Due to this increased distance and time to contact, the firing of the airbag must be delayed to simulate bag fire vs contact time relationship. Consequently, at bag fire time, there is relative velocity between the door and dummy which is not present in the full side impact crash test. The overall result is that the relative velocity, relative displacement, and deployment space cannot be reproduced but must be roughly approximated. This makes accurate evaluation of airbag deployment and dummy injury very difficult, if not impossible.

Figure 3:
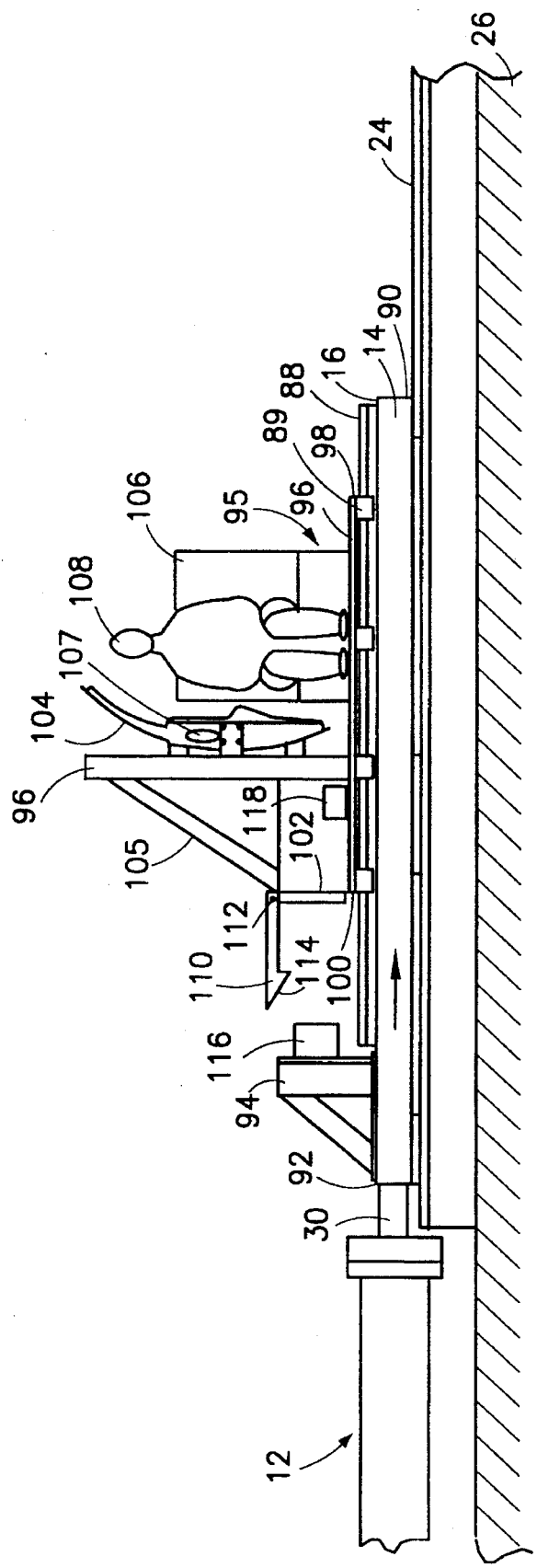
FIG. 3 is a diagrammatic drawing of one embodiment of an apparatus of this invention.

Apparatus of this invention is illustrated in FIG. 3. In the side impact dynamic testing apparatus of this invention a pressure differential apparatus system 10 as shown in FIG. 1 is employed as shown in FIG. 3. Fixed test buck 18 is removed from sled carriage 14.

In place of removed test buck 18, a second set of guide rails or tracks 88 is fixedly mounted longitudinally on the top horizontal surface 16 of the sled carriage 14 between the leading edge 90 and the trailing edge 92 of the sled carriage. Adjacent trailing edge 92 an impact ram 94 is fixedly placed on the top surface 16 of the sled carriage 14 and generally interposed laterally between guide rails or tracks 88.

Mounted on the guide rails or tracks 88, by means of suitable slide bearings 89, for slidably longitudinal movement along said guide rails or tracks 88 is a test dolly assembly, indicated generally by 95. The test dolly assembly 95 comprises a frame structure member 96 having a leading face 98 and a trailing face 100. An impact block 102 is positioned on the frame structure 96 facing in the direction of the trailing face 100 for being strikable by impact ram 94 upon appropriate acceleration of sled carriage 14. Suitably fixedly mounted on frame structure 96 and facing its leading edge 98 is a crash test member 104, generally a vehicle door structure. The door structure may have a side impact airbag 107 appropriately placed therein. Additionally, the airbag 107 may be in the vicinity of the door 104, generally adjacent thereto in a pillar or in a seat member. The airbag 107 is caused to be inflated and deployed upon actuation of a sensor 18, such as an accelerometer, which measures the rate of acceleration of dolly assembly 95 and causes deployment of the airbag when side impact crash conditions are sensed. Frame structure 96 may be suitably held in place and stabilized against distorted movement by a reinforcing structure member 105 extending from impact block 102 to frame structure 96.

Adjacent the crash test member 104 on a side thereof opposite impact block 102 is a mounted seating means 106, such as a rigid bench seat, upon which is seated an anthropomorphic side impact test specimen or dummy 108. In this embodiment, seating means 106 is shown fixedly mounted on test dolly assembly 95. However, if desired, seating means 106 may be slidably mounted on a third set of tracks or guide rails and bearings located on frame structure 96 of test dolly assembly 95. Anthropomorphic specimen 108 is seated so as to face essentially perpendicular to said guide rails or tracks 88 whereby, upon acceleration of the test dolly assembly 95, the specimen is caused to be struck sideways by the crash test door 104. Test dolly assembly 95 and its component parts, namely frame structure 96, impact block 102, crash test member 104, seat 106 and dummy 108, remains stationary on second track or guide rail means 88 of sled carriage 14 due to inertia until impact ram 94 on the sled carriage 14 is caused to strike impact block 102 after acceleration of sled carriage 14 by thrust column 30 upon firing thrust apparatus 12. FIG. 3 depicts the apparatus of this invention at a time before the thrust apparatus 12 has been fired causing thrust column 30 to be accelerated and impact sled carriage 14 thereby accelerating sled carriage 14 along track 24. Movement of sled carriage 14 on tracks 24 and under stationary test dolly assembly 95 will cause impact ram 94 to accelerate and move toward trailing face 100 of frame member 96 and thereby strike impact block 102. Thus, striking of impact block 102 by impact ram 94 does not occur until sled carriage 14 and impact ram 94 thereon have already reached a considerable velocity. In this manner, crash test member 104, namely a vehicle door, is able to reach a desired high velocity in an extremely short period of time so as to simulate a velocity-time profile of an actual side impact.

A HYGE crash simulator apparatus will have a braking system installed (not shown) for deceleration and stopping travel of the sled carriage 14 along tracks 24 after its acceleration by thrust column 30. In order to avoid the necessity for providing a separate braking system for the test dolly assembly 95 on guide rails or tracks 88, frame structure member 96 is provided with a downwardly biased latch clamp 110 pivotable about axis 112 for clamping test dolly assembly 95 to impact ram 94 upon impact of the impact ram 94 with impact block 102. By clamping to impact ram 94, the test dolly structure 95 may be braked with the braking system employed for the sled carriage 14. Latch clamp 110 preferably has an angled leading edge 114 to permit impact ram 94 to overcome the downward bias of the clamp and strike impact block 102 whereby the test dolly structure becomes integrally attached to sled carriage 14 by engagement of latch clamp 110 with impact ram 94.

Adjustment or control of the velocity-time profile, i.e. the rate of acceleration of the test dolly 95 and thus crash test door 104, can be accomplished by placing an energy absorbing material 116, such as for example an aluminum honeycomb material, between impacting surfaces of impact ram 94 and impact block 102. FIG. 3 shows the placement of such energy absorbing material 116 on the impact ram 94. However, it will be appreciated that the material could instead be similarly placed on the impact surface of impact block 102. By adjusting the size and stiffness of energy absorbing material 116 employed between the impacting surfaces, the velocity-time profile needed to simulate a particular side-impact crash can be readily obtained.

When a 12" wide×12" thick×24" long Hexel #3.7-3/8-0.0025N5052 aluminum honeycomb material, having a crush strength of approximately 180 psi, is employed as the energy absorbing material 116 in the apparatus of this invention, a simulated side impact is provided producing a velocity-time profile, as shown in Curve C of FIG. 2. As shown by Curve C a door velocity of 20 mph is obtained at 17 ms after $T_0$. Timing from $T_0$ to critical points, such as airbag deployment within about 5 ms and door velocity of 20 mph within 20 ms after $T_0$, is maintained very well by the simulated crash (Curve C) compared to the actual crash (Curve A).

With the foregoing description of the invention, those skilled in the art will appreciate that modifications may be made to the invention without departing from the spirit thereof. Therefore, it is not intended that the scope of the invention be limited to the specific embodiments illustrated and described.

What is claimed is:

1. Apparatus for dynamic testing by rapidly accelerating a specimen, comprising in combination:

a pressure differential firing means terminating in a thrust surface;

a sled carriage slidably mounted on first track means attached to a fixed foundation for free longitudinal movement of said sled carriage along the track means, said sled carriage having a horizontal top surface terminating in a leading edge at one end and a trailing edge at an opposite end of the sled carriage, the trailing edge positioned for being accelerated by the thrust surface upon actuation of the firing means;

second track means fixedly mounted on the top horizontal surface of the sled carriage longitudinally between the leading edge and the trailing edge of said sled carriage;

ram means located on said horizontal surface of the sled carriage adjacent the trailing edge;

a test dolly assembly slidably mounted on said second track means for free longitudinal movement along the second track means; said test dolly assembly comprising a frame structure member having:

a leading face and a trailing face, an impact block facing toward the trailing face of said frame structure and being strikable by said ram means for imparting longitudinal movement to said test dolly assembly along the second track means, a crash test member facing toward the leading face of the frame structure, and adjacent the crash test member on a side thereof opposite the impact block, a seating means for seating an anthropomorphic test specimen;

said test dolly assembly being essentially stationary on the second track means of the sled carriage due to inertia thereof until the ram means on the sled carriage moving longitudinally on the first track means strikes the impact block of the test dolly assembly.

2. Apparatus according to claim 1 for dynamic testing of a specimen in a simulated side impact crash of an automobile, wherein the crash test member comprises a vehicle door.

3. Apparatus according to claim 2 wherein said vehicle door comprises an automobile door having an airbag installed in or adjacent to the automobile door.

4. Apparatus according to claim 3 wherein an energy absorbing material is mounted to an impact surface on one of said ram means and said impact block.

5. Apparatus according to claim 4 wherein the energy absorbing material is an aluminum honeycomb material.

6. Apparatus according to claim 5 additionally comprising an anthropomorphic test specimen seated on said seating means in a manner whereby the test specimen faces essentially perpendicular to said second track means and upon acceleration of the test dolly assembly is caused to be struck sidewise by the crash test member.

7. Apparatus according to claim 1 wherein an energy absorbing material is mounted to an impact surface on one of said ram means and said impact block.

8. Apparatus according to claim 7 wherein the energy absorbing material is an aluminum honeycomb material.

9. Apparatus according to claim 1 additionally comprising an anthropomorphic test specimen seated on said seating means in a manner whereby the test specimen faces essentially perpendicular to said second track means and upon acceleration of the test dolly assembly is caused to be struck sidewise by the crash test member.

10. Apparatus according to claim 1 wherein said test dolly assembly additionally comprises latch means for integrally connecting said test dolly assembly to said sled carriage upon impact of the ram means with the impact block.

11. A method for conducting dynamic testing by rapidly accelerating a specimen, said method comprising:

(1) providing, a pressure differential firing means, terminating in a thrust surface;

a sled carriage slidably mounted on first track means attached to a fixed foundation for free longitudinal movement of said sled carriage along the track means, said sled carriage having a horizontal top surface terminating in a leading edge at one end and a trailing edge at an opposite end of the sled carriage, the trailing edge positioned for being accelerated by the thrust surface upon actuation of the firing means;

second track means fixedly mounted on the top horizontal surface of the sled carriage longitudinally between the leading edge and the trailing edge of said sled carriage;

ram means located on said horizontal surface of the sled carriage adjacent the trailing edge;

a test dolly assembly slidably mounted on said second track means for free longitudinal movement along the second track means; said test dolly assembly comprising a frame structure member having:
   a leading face and a trailing face,
   an impact block facing toward the trailing face of said frame structure and being strikable by said ram means for imparting longitudinal movement to said test dolly assembly along the second track means,
   a crash test member facing toward the leading face of the frame structure, and
   adjacent the crash test member on a side thereof opposite the impact block, a seating means for seating an anthropomorphic test specimen;

an anthropomorphic test specimen seated on said seating means and facing perpendicular said second track means;

said test dolly assembly being essentially stationary on the second track means of the sled carriage due to inertia thereof until the ram means on the sled carriage moving longitudinally on the first track means strikes the impact block of the test dolly assembly;

(2) actuating the firing means to fire the thrust surface whereby the thrust surface accelerates the sled carriage for longitudinal movement along the first track means whereby the ram means strikes the impact block thereby overcoming the inertia of the test dolly assembly on the second track means causing rapid acceleration of said test dolly assembly for longitudinal movement along the second track means whereby the crash test member and a side of the anthropomorphic test specimen are caused to impact each other in a simulated side impact vehicle crash;

(3) observing the effect of the impact of the anthropomorphic test member with the crash test member.

12. A method according to claim 11 for dynamic testing of a specimen in a simulated side impact crash of an automobile, wherein the crash test member comprises an automobile door having an airbag installed in or adjacent to said door and said airbag is caused to be deployed upon a sensor sensing impact of the ram means with the impact block.

13. A method according to claim 12 wherein the rate of acceleration of the test dolly assembly upon striking of the impact block by the ram means is controlled by the presence of energy absorbing material mounted to an impact surface of one of said ram means and said impact block.

14. A method according to claim 13 wherein the rate of acceleration of the dolly assembly is controlled by the presence of aluminum honeycomb material mounted to an impact surface of said ram means.

15. A method according to claim 14 wherein the crash test member door is accelerated to a velocity of about 20 miles per hour within about 20 milliseconds of the ram means striking the impact block and the airbag is caused to be deployed within about 5 milliseconds of the ram means striking the impact block.

* * * * *